US010059882B2

(12) United States Patent
Sanderson et al.

(10) Patent No.: US 10,059,882 B2
(45) Date of Patent: Aug. 28, 2018

(54) EFFICIENT DRYING AND PYROLYSIS OF CARBON-CONTAINING MATERIAL

(71) Applicant: EARTH SYSTEMS CONSULTING PTY LTD, Hawthorn, Victoria (AU)

(72) Inventors: Philip John Sanderson, Castlemaine (AU); Adrian Lindsay Morphett, Kew (AU)

(73) Assignee: EARTH SYSTEMS CONSULTING PTY LTD, Hawthorn (AU)

( * ) Notice: Subject to any disclaimer, the term of this patent is extended or adjusted under 35 U.S.C. 154(b) by 501 days.

(21) Appl. No.: 14/423,147

(22) PCT Filed: Aug. 29, 2013

(86) PCT No.: PCT/AU2013/000969
§ 371 (c)(1),
(2) Date: Feb. 23, 2015

(87) PCT Pub. No.: WO2014/032104
PCT Pub. Date: Mar. 6, 2014

(65) Prior Publication Data
US 2015/0210926 A1 Jul. 30, 2015

(30) Foreign Application Priority Data

Aug. 30, 2012 (AU) .................. 2012903743

(51) Int. Cl.
*F23G 5/12* (2006.01)
*D06F 75/00* (2006.01)
(Continued)

(52) U.S. Cl.
CPC .............. *C10B 21/00* (2013.01); *C10B 1/04* (2013.01); *C10B 49/02* (2013.01); *C10B 53/02* (2013.01); *Y02E 50/14* (2013.01); *Y02P 20/129* (2015.11)

(58) Field of Classification Search
CPC ................ F23G 5/12; G01L 1/16; G10L 5/00
(Continued)

(56) References Cited

U.S. PATENT DOCUMENTS 4,306,506 A 12/1981 Rotter
4,428,308 A 1/1984 Birchfield et al.
(Continued)

FOREIGN PATENT DOCUMENTS

GB 1478906 A 7/1977
JP 2007146016 A 6/2007
(Continued)

OTHER PUBLICATIONS

Konika Khan, Australian Patent Office, Examination Report No. 3, Australian Application No. 2013308399, dated Jan. 5, 2018, Woden Act 2606, Australia.
(Continued)

*Primary Examiner* — Monzer R Chorbaji
(74) *Attorney, Agent, or Firm* — Louis Ventre, Jr.

(57) ABSTRACT

A method and apparatus for drying and pyrolyzing carbon-containing materials to produce valuable products including char, oil, gas and thermal energy. The present invention involves a method whereby carbon-containing material 1 is maintained in a heated region predominantly free of oxidizing gases to promote pyrolysis reactions, and the thermal energy required to drive the process is provided via the combustion of a proportion of the volatilized matter with an oxygen containing gas in the same chamber 3. The arrangement of the chamber 3 eliminates the need for any form of solid physical barrier between the concurrent pyrolysis and combustion reactions occurring in the process, and also avoids any requirement for external means of recirculating the gaseous volatilized matter. The present invention also relates to a method for improving the transfer of thermal
(Continued)

energy from the combustion to pyrolysis zones via radiative and convective heat transfer mechanisms.

12 Claims, 1 Drawing Sheet

(51) Int. Cl.
*F23L 13/00* (2006.01)
*F23L 1/00* (2006.01)
*C10B 21/00* (2006.01)
*C10B 1/04* (2006.01)
*C10B 49/02* (2006.01)
*C10B 53/02* (2006.01)

(58) Field of Classification Search
USPC ..... 110/229–230, 315, 308–309; 48/76, 111; 422/188, 307–308; 585/7, 241
See application file for complete search history.

(56) References Cited

U.S. PATENT DOCUMENTS

| | | | |
|---|---|---|---|
| 4,583,992 A | 4/1986 | Rogers | |
| 4,584,947 A | 4/1986 | Chittick | |
| 4,929,254 A * | 5/1990 | Kooiman | C10J 3/26 48/111 |
| 5,028,241 A | 7/1991 | Kooiman et al. | |
| 5,157,176 A | 10/1992 | Munger | |
| 7,569,204 B2 | 8/2009 | Leveson | |
| 7,780,750 B2 | 8/2010 | Carman | |
| 7,819,070 B2 | 10/2010 | Rehmat et al. | |
| 2007/0014713 A1 | 1/2007 | Beierle | |
| 2008/0098653 A1 | 5/2008 | Patil et al. | |
| 2009/0064578 A1 | 3/2009 | Theegala | |
| 2009/0260286 A1 | 10/2009 | Sasauchi et al. | |
| 2010/0037519 A1 | 2/2010 | Patil et al. | |
| 2010/0098596 A1 | 4/2010 | Leveson | |
| 2010/0115841 A1 | 5/2010 | Cork | |
| 2010/0180805 A1 | 7/2010 | Cheiky | |
| 2010/0257775 A1 | 10/2010 | Cheiky | |
| 2010/0275514 A1 | 11/2010 | Paganessi et al. | |
| 2010/0300866 A1 | 12/2010 | van Aardt et al. | |
| 2011/0011721 A1 | 1/2011 | Champagne | |
| 2011/0041395 A1 | 2/2011 | Newbold et al. | |

FOREIGN PATENT DOCUMENTS

| | | |
|---|---|---|
| WO | WO2009147346 A2 | 12/2009 |
| WO | WO2010129988 A1 | 11/2010 |

OTHER PUBLICATIONS

Konika Khan, Australian Patent Office, International Search Report, PCT/AU2013/000969, dated Oct. 21, 2013, Woden Act 2606, Australia.

Craig Gleghorn, Letter explaining Demand for International Preliminary Examination re PCT/AU2013/000969, dated Jun. 30, 2014, Melbourne, Vic 3001, Australia.

Konika Khan, Australian Patent Office, International Preliminary Report on Patentability re PCT/AU2013/000969, dated Sep. 1, 2014, Woden Act 2606, Australia.

* cited by examiner

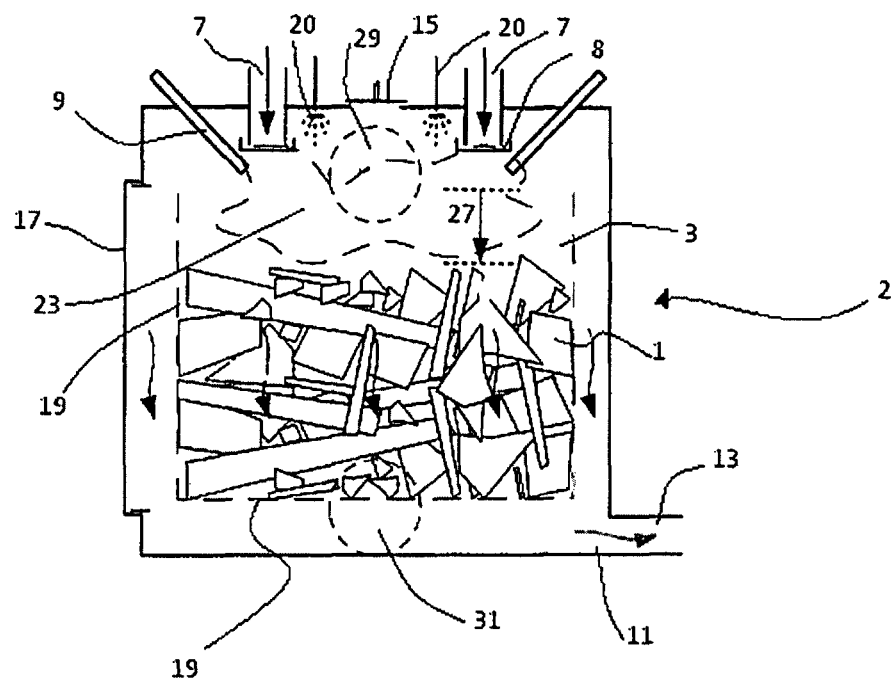

EFFICIENT DRYING AND PYROLYSIS OF CARBON-CONTAINING MATERIAL

FIELD OF THE INVENTION

The present invention relates to a method and an apparatus for drying and pyrolysing carbon-containing materials to produce valuable products such as char, oil, gas and thermal energy.

BACKGROUND TO THE INVENTION

Pyrolysis processes can be categorised as "fast pyrolysis" and "slow pyrolysis", depending on the heating rate experienced by the carbon-containing feedstock. "Slow pyrolysis" processes typically involve long residence times and low heating rates (for example, less than 10° C. per second). Example slow pyrolysis processes include systems based on packed bed reactors, retorts and kilns. "Fast pyrolysis" processes involve the rapid decomposition of biomass under high heating rates (for example, greater than 100° C. per second) and favours the formation of products which are liquids at room temperature at the expense of solid carbon-containing products such as char. Typical fast pyrolysis processes involve feedstocks reduced to a small physical size which are moving in order to maximise heat and mass transfer rates, for example by the use of gas-fluidized beds, entrained flow reactors, rotary kilns or screw furnaces.

The pyrolysis of carbon-containing materials requires material to be heated in a non-oxidising, or "reducing" environment at moderate temperatures (eg from 200° C. up to 1000° C.). The process cannot be carried out in the open air or where free oxygen is present as the material to be pyrolysed will ignite and burn (oxidise) in the air at these processing temperatures, with the end result that the desirable products of the process are destroyed. Because of this, the process must be carried out in such a way that the presence of free oxygen is minimised. As heating is required to raise the temperature of the material and drive the pyrolysis process, a heat source (such as a combustion arrangement) is typically used. Because combustion requires oxygen, the combustion arrangement needs to be physically separated from the pyrolysis zone to prevent oxygen ingress into the pyrolysis zone.

In order to maintain a reducing environment, pyrolysis has in the past been undertaken by containing the material to be pyrolysed in a vessel or container from which air is excluded (usually by some form of air lock system or an arrangement of one-way valves) and which is then indirectly heated from the outside, ie with a solid barrier between heat source and pyrolysis zone.

Indirect heating may take the form of combustion of a separate fuel to provide the necessary heat input, or more often also involves the recovery and combustion of the pyrolysis product gases (volatiles) generated in the process by enabling them to be conveyed from the pyrolysis process into the combustion system and used as fuel.

This physical separation arrangement often involves one vessel inside another, or one pipe inside another, for example where the heating process occurs in the outer vessel or pipe, and the pyrolysis occurs inside the inner vessel or pipe. Electric elements or hot oil loops may also be used to provide heat into the material without exposure to oxidising conditions, however the operating cost of this approach limits its applicability. The presence of solid barriers also introduces limitations on scale-up, thermal efficiency and constrains options for the physical configuration of the process, which detrimentally affects process economics.

The physical arrangements necessary to minimise oxygen may also introduce additional requirements for feed preparation and product handling, in particular feedstock size reduction may become necessary to enable feed to be added and product withdrawn whilst maintaining the necessary reducing environment within the process.

The indirect heating methods commonly used in pyrolysis technologies add costs in construction (a separate sealed chamber being required for the pyrolysing charge, as well as the outer assembly containing the heating system). The indirect method also causes relatively poor transfer of heat from the heating system to the pyrolysing charge, as all heat must be conducted through the walls of the pyrolysis vessel, resulting in poor overall thermal efficiency.

Any discussion of documents, devices, acts or knowledge in this specification is included to explain the context of the invention. It should not be taken as an admission that any of the material formed part of the prior art base or the common general knowledge in the relevant art in Australia or any other country on or before the priority date of the claims herein.

SUMMARY OF THE INVENTION

It would be desirable to provide an apparatus and method for drying and pyrolysing carbon-containing feedstock which eliminates the requirement for a solid barrier between the heat-generating combustion (oxidation) zone and the material undergoing pyrolysis.

In accordance with a first aspect of the invention, there is provided apparatus for drying and pyrolysing carbon-containing feedstock, the apparatus including a substantially sealed reaction chamber for locating therein carbon-containing feedstock, the reaction chamber including one or more inlet ports in an upper portion of the reaction chamber, the inlet ports being connectable to an oxygen containing gas source to thereby facilitate the supply of oxygen containing gas to the reaction chamber, the reaction chamber further including one or more outlet ports in a lower portion of the reaction chamber for enabling gases generated within the reaction chamber to escape, wherein, in use, carbon-containing feedstock is positioned in the reaction chamber such that a top portion of the feedstock is above the outlet port and at or below the inlet port, and wherein combustion of the top portion of the feedstock provides the heat required for drying and pyrolysing the remaining feedstock in the chamber, and wherein the flow rate of oxygen containing gas entering the chamber via the inlet port is regulated in response to temperature measurements within the reaction chamber, to thereby establish optimal conditions within the reaction chamber for pyrolysing the feedstock.

Preferably, the one or more the outlet ports are positioned towards a bottom of the reaction chamber such that gases generated within the reaction chamber flow through the feedstock to reach the outlet port.

The apparatus may further include one or more temperature probes for measuring the temperatures within the reaction chamber. In this respect, at least one of the temperature probes may be located in an upper portion of the reaction chamber and at least one temperature probes may be located in a lower portion of the reaction chamber.

The reaction chamber may further include a re-sealable hatch door for enabling loading of feedstock into the reaction chamber. The apparatus may further include a cage structure for containing the feedstock in the reaction chamber.

One or more of said inlet ports may include a baffle or diffuser for assisting in the distribution of oxygen containing gas entering the reaction chamber.

The apparatus may further include one or more water sprayers in an upper section of the reaction chamber. In addition, the reaction chamber may include a pressure relief device for releasing excess pressure in the reaction chamber.

In accordance with another aspect of the invention, there is provided method of drying and pyrolysing carbon containing feedstock in a substantially sealed reaction chamber having one or more inlet ports in an upper portion thereof, and one or more outlet ports in a lower portion thereof, the one or more inlet ports being connectable to an oxygen containing gas source to thereby facilitate the supply of oxygen containing gas to the reaction chamber, the one or more outlet ports enabling gases generated within the reaction chamber to escape the chamber, the method including the steps of:

positioning carbon containing feedstock in the reaction chamber such that, a top portion of the feedstock is above the outlet port and at or below the inlet port, providing a flow of oxygen containing gas to the reaction chamber from the oxygen containing gas source via the inlet port, combusting a top portion of the feedstock to provide the required heat for drying and pyrolysing the remaining feedstock in the chamber, and regulating the flow of oxygen-containing gas entering the chamber inlet in response to temperature measurements within the reaction chamber, to thereby establish optimal conditions within the reaction chamber for pyrolysing the feedstock.

The temperature measurements within the chamber preferably include at least one temperature measurement in an upper region of the chamber and at least one temperature measurement in a lower region of the chamber.

The combustion of the top portion of the feedstock is preferably instigated by ignition of the feedstock by one or more ignition sources.

In addition, the flow of oxygen-containing gas is preferably reduced once the temperature measured in a lower region of the chamber reaches a minimum target temperature. In this regard, the minimum target temperature is preferably between approximately 150° C. and 600° C.

Further, the flow of oxygen-containing gas is preferably controlled such that the temperature measured in the upper region of the chamber does not exceed a predetermined maximum.

The method may further include the step of maintaining temperature conditions within the reaction chamber for a specified time period once the minimum target temperature is reached.

Further, the oxygen-containing gas may be pre-heated by an external heat source prior to entering the chamber inlet. In this respect, the external heat source may be heat recovered from another reaction chamber.

In another embodiment, the oxygen-containing gas may pre-heated prior to entering the inlet of the chamber by heat recovered from gases which have escaped from the reaction chamber via the one or more outlet ports.

The present invention advantageously provides an alternative to known pyrolysis technologies, and does not require a solid barrier between the heat-generating oxidation reactions and the pyrolysing carbon-containing feedstock. The present invention also avoids the need for an external means of recirculating the gaseous volatilised matter to the combustion zone.

BRIEF DESCRIPTION OF DRAWING

FIG. 1 is a cross-sectional view of an apparatus for drying and pyrolysing carbon-containing feedstock, in accordance with a preferred embodiment of the invention.

DETAILED DESCRIPTION OF THE PREFERRED EMBODIMENTS

Before proceeding to describe preferred embodiments of the present invention, it is important to note that various terms used throughout the specification have meanings that will be well understood by the skilled addressee. For ease of reference, some of these terms will now be defined.

The term "carbon-containing feedstock" as used herein includes but is not limited to raw and manufactured wood, grass and crop residues, other biomass, coal, oil shales, plastics, paper-based products and also includes blends of these materials.

The term "biomass" is understood herein to mean living or recently living organic matter. Specific biomass products include, by way of example, forestry products and timber-mill wastes, agricultural products, biomass produced in aquatic environments such as algae, agricultural residues such as straw, seed husks, fruit pits and nut shells, animal wastes and carcasses, municipal and industrial residues.

The term "coal" is understood herein to include, by way of example, peat, lignite, sub-bituminous coal, bituminous coal, anthracite and a range of products known as "coal wastes".

The term "oil shales" is understood herein to include by way of example any geological sedimentary material containing a usable proportion of carbon-containing molecules.

The term "pyrolysis" is understood herein to mean the thermal decomposition of carbon-containing material in the absence of, or with a limited supply of an oxygen containing gas. Depending on the processing conditions this includes drying and partial thermal decomposition of the carbon-containing material through to complete decomposition of the carbon-containing material into decomposition products such as liquids, char, ash and gas. The gases may typically include carbon monoxide, carbon dioxide, methane, hydrogen, hydrocarbons and partially oxygenated organic molecules. The liquids may typically include water, tars, hydrocarbons and partially oxygenated organic molecules.

The present invention is a pyrolysis reactor configuration which is highly scalable, of low capital cost, possesses high thermal efficiency, does not require complex feedstock pretreatment or physical size reduction and can be applied to both batch and continuous pyrolysis processes in a stationary or transportable configuration.

With reference to the accompanying drawing, there is shown a cross-sectional view of an apparatus 2 for drying and pyrolysing a solid carbon-containing material such as carbon-containing feedstock 1. The apparatus 2 includes a thermally insulated and gas sealed reaction chamber 3 into which carbon-containing feedstock 1 is introduced. A controlled quantity of an oxygen-containing gas is supplied via at least one inlet port 7 located in an upper portion of the reaction chamber 3 such that it is at or above a top surface of the solid carbon-containing feedstock 1. In a preferred embodiment, the inlet port 7 may include a baffle or diffuser 8 to aid in distributing the incoming gas. The oxygen-containing gas flows into the reaction chamber 3 by virtue of the supply pressure of the gas being greater than the pressure inside the reaction chamber 3. It will be apparent to those familiar with the art that the flow rate of the oxygen-containing gas may be controlled by altering the relative pressure of the supply with respect to the pressure of the reaction chamber 3 by any of a number of well-known means, such as a variable speed blower or air fan, or a fixed speed fan with a flow control valve.

The reaction chamber 3 may contain at least one ignition source 9 which may be permanently installed or removable, and which is in a location generally at or above an upper surface of the pyrolysing carbon-containing feedstock 1. The ignition source 9 may be operated continuously, but is more often only required to initiate the combustion process, and may be of several possible designs, such as hot air, gas burner, or electric elements. Hot gaseous or liquid reaction products from the process are withdrawn at or below a bottom surface of the solid carbon-containing feedstock material 1 and exit the reaction chamber 3 via one or more outlet ports 13 which may, in a preferred embodiment, be arranged to assist hot gas distribution within the reaction chamber 3. The reaction products may be sent to any number of additional downstream processes, such as an afterburner, scrubber or refining system. The hot gaseous or liquid reaction products which exit the reaction chamber 3 can also be used to heat the oxygen-containing gas prior to entering the one or more inlets 7.

The reaction chamber 3 may include an explosion pressure relief facility 15, that is, a re-sealable opening which quickly responds to overpressure conditions inside the reaction chamber 3 and vents excess gas in a controlled manner as a means of emergency pressure relief to safely discharge any sudden build-up of gas pressure inside the reaction chamber 3. In the case of a batch configuration as shown in FIG. 1, solid pyrolysis products are loaded and withdrawn from the reaction chamber 3 when the process is turned off. For the batch option, a re-sealable loading/unloading hatch door 17 is provided as a means for the loading and unloading of material to and from the reaction chamber 3 before and after each processing run. A cage or basket arrangement 19 positionable within the reaction chamber 3 is one of a number of possible means to retain the feedstock 1 and product in order to facilitate batch loading and unloading operations. Product cooling may involve the addition of a vaporising liquid such as water to speed up the cooling process by any of a number of possible means. In a preferred embodiment, this may be accomplished by one or more water sprays devices 20 positioned in an upper section of the reaction chamber.

Mechanistically, the process involves a number of stages. The following procedure is provided as an example of the process as it may apply in one particular preferred embodiment, namely a batch pyrolysis process sized to suit a modified "20 foot" conventional shipping container, which forms the exterior structural component of the reaction chamber 3.

The reaction chamber 3, which has an internal volume of approximately 15 cubic meters, is first loaded with feedstock 1 via the hatch 17. In this respect the feedstock 1 is loaded into the cage arrangement 19 which is then inserted into the reaction chamber 3 via the hatch door 17. Then, the ignition source(s) 9 are used in conjunction with a controlled flow of oxygen-containing gas at a flow rate ranging from 1000 to 2000 cubic meters per hour, entering the reaction chamber 3 via the inlet ports 7 to initiate the combustion of a top portion of the carbon-containing feedstock 1. Once this combustion phase has been initiated, the ignition source(s) 9 may be turned off and the combustion of the top portion of the carbon-containing feedstock 1 is maintained via the control of the oxygen-containing gas 5. Hot gaseous combustion products percolate downwards through the carbon-containing feedstock 1, (as represented by the curved arrows in FIG. 1), in order to make their way down to the one or more outlet ports 13 and in doing so transfer heat to the bulk of the carbon-containing feedstock material 1, raising its temperature to the point where pyrolysis reactions commence and an increasing volume of pyrolysis product gases are released into the reaction chamber 3. Ultimately, pyrolysis gases predominate in the chamber 3 and those gases which flow to the upper portion of the chamber are able to undergo combustion with the oxygen-containing gas available directly in the vicinity of the inlet port(s) 7. At this stage, the flow rate of the oxygen containing gas may be reduced to a lower flow rate, for example 300 to 500 cubic meters per hour, and a zone or region of volatiles combustion 23 involving the complete consumption of all incoming free oxygen is established at the top of the reaction chamber 3, and no free oxygen is available to contact the solid carbon-containing feedstock 1. The combustion heat energy released in this volatiles combustion zone 23 now generates a net flow of hot combustion product gases downwards (as represented by the curved arrows in FIG. 1) through the bulk of the pyrolysing carbon-containing feedstock 1 and serves to heat the bulk material, and drive the drying process and pyrolysis reactions (through the provision of thermal energy to support endothermic reactions). The temperature within the reaction chamber 3 is controlled by adjustment of the flow rate of the oxygen containing gas into the chamber 3 via the inlet ports 7. In some cases, the separation between the oxidising volatiles combustion zone 23 and the reducing carbon-containing feedstock 1 region is further enhanced due to a progressive volume reduction in the pyrolysing solid mass, which results in additional vertical separation 27 between the top combustion zone and the pyrolysing material. In a preferred embodiment, the hot product gases exiting the chamber 3 via the outlet port(s) 13 may be used as a source of heat to other processes via a secondary combustion chamber. In another preferred embodiment, the hot product gases exiting the chamber 3 may be vented to the atmosphere after suitable emission control measures are taken (eg an afterburner arrangement). In another preferred embodiment, the hot product gases exiting the chamber 3 may be cooled and cleaned (eg via a scrubber) and supplied to a prime mover such as a reciprocating engine or gas turbine for the production of shaft power to drive other equipment or generate electricity.

A preferred process control strategy involves temperature measurement at a number of key locations within the reaction chamber 3 and the regulation of the flow of oxygen-containing gas via a control system to achieve or maintain desirable temperature conditions. In a preferred embodiment, these temperature measurements are made internally at one or more locations 29 in an upper region of the chamber 3, and one or more locations 31 in a bottom region of the chamber 3. In a preferred process control strategy, a control algorithm may be used such that the process achieves a minimum target temperature near the bottom 31 of the reaction chamber, which may be within the range 150 to 600° C. but does not exceed a maximum temperature at the upper region 29 of the chamber 3, which may be within the range 500 to 1000° C. Once the minimum bottom region target temperature is achieved, the temperature conditions may be maintained within the reaction chamber 3 for a specific time-period, which may be for example, 30 minutes in a preferred operating method. It should be noted that the specific temperatures and processing times may be adjusted to achieve optimum performance for a given size and moisture content of carbon-containing feedstock 1. In a preferred embodiment, these top and bottom region temperature points are located approximately 200 mm above and 200 mm below the cage arrangement 19 containing the feedstock 1 and product. In a preferred embodiment, the depth of carbon-containing feedstock 1 in the reaction chamber 3 is specified for a given mean size of feedstock particles, such that gas bypassing is minimised. An example of one such combination is a bed depth of 1800 mm for a feedstock with an average particle thickness of 75 to 150 mm. In a further preferred embodiment, a mechanical agitator may be used to create mobility within the carbon-containing feedstock 1, which may be beneficial, for example in improving the distribution of the flow of gases through the solid material and improving heat and mass transfer processes between the solid and gaseous phases. Once the desired temperature conditions have been achieved in the reaction chamber 3 and maintained for the desirable time period, the flow of oxygen-containing gas is stopped and the material is allowed to cool down prior to removal from the chamber 3. In a preferred embodiment, the rate of cooling may be beneficially reduced by the controlled addition of a liquid which may be vaporised at the prevailing temperatures, thus removing heat from the material and reaction chamber 3. In a preferred embodiment, the liquid may be water.

In the embodiment of FIG. 1, a batch processing scenario is indicated. However, an alternative embodiment involving a continuous top feed and bottom withdrawal of product material from the chamber is equally feasible provided that the ingress of oxygen is minimised (eg via the use of air locks or rotary valves) and such an arrangement could be implemented by those familiar with the art.

Advantages

The apparatus of the present invention advantageously eliminates the need for any form of solid physical barrier between the concurrent pyrolysis and combustion reactions occurring in the reaction chamber 3. The geometric arrangement of the chamber 3 also avoids any requirement for external means of recirculating the gaseous volatilized matter.

The thermal energy required to drive the process is advantageously provided by the combustion of a portion of the volatilized matter with an oxygen containing gas in the same chamber as the carbon-containing material undergoing pyrolysis. No external heat sources are required to operate the process, other than an ignition source 9 upon initial start-up.

The present invention advantageously only requires a simple cascading temperature controller with a minimum of only two measurements points required to operate the process correctly.

Whilst feedstock size reduction (eg chipping or grinding) may be advantageous in external materials handling arrangements, it is not by any means a necessary requirement for the operation of the process. This increases the flexibility and range of potential applications for the process beyond many other previous approaches.

By incorporating an ignition and heating system directly into a single chamber 3, where, by virtue of the arrangement of the internals, the combustion of a limited portion of the feed material and also a portion of the volatile products of the pyrolysis process provides sufficient thermal energy to drive the entire pyrolysis process to completion. The internals are arranged in such a way that the small amount of oxidising gases required to support the limited combustion occurring in the chamber 3 are entirely consumed prior to impinging on the bulk of the material to by pyrolysed; by this means the gaseous products of combustion which do impinge on the material are by that stage in a non-oxidising form, and can, via convection, directly provide the necessary heating to the bulk material to drive the pyrolysis process whilst maintaining an overall reducing atmosphere.

The geometric arrangement of the reaction chamber 3 in a vertical plane advantageously enables the heat source (combustion zone) to be vertically separate from the process (pyrolysis zone) once the material volume (height of material) has started to decrease, and the arrangement also allows the hot combustion gases to pass through the material, transferring heat in order to exit the process.

In the case of a continuous configuration, solid carbon-containing feedstock materials may be introduced into the upper portion of the reaction chamber 3 and withdrawn from the lower portion of the reaction chamber 3 either continuously or in batches, but without requiring the shut-down of the process.

For a continuous process, airlocks (rotary valves, lock hoppers, double valves etc) may be used to allow feed and withdrawal of material whilst maintaining isolation from ambient atmosphere.

The reaction chamber 3 may also be provided with a means of loading and unloading material, eg screw auger arrangement for a continuous processing arrangement, or load-unload hatches 17 for a batch processing arrangement.

As the present invention may be embodied in several forms without departing from the essential characteristics of the invention it should be understood that the above described embodiments should not be considered to limit the present invention but rather should be construed broadly. Various modifications and equivalent arrangements are intended to be included in the spirit and scope of the invention.

The invention claimed is:

1. An apparatus for drying and pyrolyzing a carbon-containing feedstock, the apparatus comprising:
   a reaction chamber that is substantially sealed, the reaction chamber for locating therein the carbon-containing feedstock, the reaction chamber comprising:
      one or more inlet ports in an upper portion of the reaction chamber, the inlet ports connected to an oxygen-containing gas source to control a flow rate of an oxygen-containing gas to the reaction chamber; and
      one or more outlet ports in a lower portion of the reaction chamber positioned so that gases, generated within the reaction chamber, flow downwards through the carbon-containing feedstock and escape out through the one or more outlet ports; and
      temperature probes configured to provide temperature measurements in the upper portion and the lower portion of the reaction chamber;
   wherein, in use, the carbon-containing feedstock is positioned in the reaction chamber such that a top portion of the carbon-containing feedstock is above the one or more outlet ports and at or below the one or more inlet ports;
   a control system operably connected with the temperature probes and the oxygen-containing gas source to further control the flow rate of the oxygen-containing gas so that combustion of the top portion of the carbon-containing feedstock in an initial combustion phase provides initial heat to raise a temperature of the carbon-containing feedstock so that pyrolysis commences;

wherein the control system also further controls the flow rate of the oxygen-containing gas in response to the temperature measurements so that the temperature measurement in the upper portion of the reaction chamber does not exceed a maximum of 500° C. to 1000° C., and the temperature measurement in the lower portion of the reaction chamber achieves a minimum target temperature of 150° C. to 600° C., so as to establish a zone or region of volatile gas combustion in the upper portion of the reaction chamber above the top portion of the carbon-containing feedstock thereby driving further pyrolysis of the carbon-containing feedstock, generating a net flow of non-oxidizing hot combustion products gases downwards through the carbon-containing feedstock and out through the one or more outlet ports thereby heating the carbon-containing feedstock and driving further pyrolysis;

wherein the control system also further controls the flow rate of the oxygen-containing gas so that the zone or region of volatile gas combustion provides complete consumption of free oxygen in the oxygen-containing gas thereby preventing free oxygen from contacting the carbon-containing feedstock; and a perforated-cage arrangement to be loaded with the carbon-containing feedstock and then inserted into the reaction chamber.

2. The apparatus of claim 1, wherein the reaction chamber further comprises a re-sealable hatch door openable for inserting the perforated-cage arrangement loaded with the carbon-containing feedstock into the reaction chamber.

3. The apparatus of claim 1, wherein at least one inlet port in the one or more inlet ports comprises a baffle or diffuser positioned to assist in distributing the oxygen-containing gas entering the reaction chamber.

4. The apparatus of claim 1, further comprising one or more water sprayers in the upper portion of the reaction chamber.

5. The apparatus of claim 1, wherein the reaction chamber further comprises a pressure relief device configured to release excess pressure in the reaction chamber.

6. A method of drying and pyrolyzing carbon containing feedstock in a reaction chamber that is substantially sealed, the reaction chamber comprising one or more inlet ports in an upper portion thereof, and one or more outlet ports in a lower portion thereof, the one or more inlet ports connected to an oxygen-containing gas source, the oxygen-containing gas source configured to supply an oxygen-containing gas to the reaction chamber, the one or more outlet ports positioned to exhaust gases generated within the reaction chamber after percolating downwards through a carbon-containing feedstock, the method including the steps of:

loading a perforated-cage arrangement with the carbon-containing feedstock and then inserting the perforated-cage arrangement into the reaction chamber such that, a top portion of the carbon-containing feedstock is above the at least one of the one or more outlet ports and at or below at least one of the one or more inlet ports, operably connecting temperature probes with a control system to provide temperature measurements in the upper portion and the lower portion of the reaction chamber;

operating the control system to combust the top portion of the feedstock to provide heat for drying and pyrolyzing the carbon-containing feedstock in the reaction chamber, and operating the control system to control:

a flow of the oxygen-containing gas in response to a temperature measurement in the upper portion of the reaction chamber and a temperature measurement in the lower portion of the reaction chamber, so that the temperature measurement in the upper portion of the reaction chamber does not exceed a maximum of 500 to 1000° C., and the temperature measurement in the lower portion of the reaction chamber achieves a minimum target temperature of 150° C. to 600° C., so as to establish a zone or region of volatile gas combustion in the upper portion of the reaction chamber above the top portion of the feedstock thereby driving further pyrolysis of the feedstock, generating a net flow of non-oxidizing hot combustion products gases downwards through the carbon-containing feedstock and out through the one or more outlet ports thereby heating the carbon-containing feedstock and driving further pyrolysis; and maintaining a flow rate of the oxygen-containing gas so that the zone or region of volatile gas combustion provides complete consumption of free oxygen in the oxygen-containing gas thereby preventing free oxygen from contacting the carbon-containing feedstock.

7. The method of claim 6, further comprising the step of providing one or more ignition sources configured to ignite the top portion of the carbon-containing feedstock.

8. The method of claim 7, further comprising the step of reducing flow of oxygen-containing gas into the reaction chamber when at least one of the temperature measurements in the lower portion of the reaction chamber reaches the minimum target temperature.

9. The method of claim 6, further comprising the step of maintaining the minimum target temperature for a specified time period.

10. The method of claim 9, further comprising the step of stopping flow of oxygen-containing gas into the reaction chamber once the specified time period has elapsed.

11. The method of claim 6, further comprising the step of pre-heating the oxygen-containing gas using an external heat source acting on the oxygen-containing gas prior to the oxygen-containing gas entering the reaction chamber.

12. The method of claim 6, further comprising the step of preheating the oxygen-containing gas prior to the oxygen-containing gas entering the reaction chamber using heat recovered from the gases exhausted from the reaction chamber via the one or more outlet ports.

* * * * *